United States Patent [19]

Ideta

[11] Patent Number: 4,531,624
[45] Date of Patent: Jul. 30, 1985

[54] CHECK VALVE USED WITH VACUUM SYSTEM FOR AN AUTOMOTIVE VEHICLE

[75] Inventor: Yasufumi Ideta, Tokyo, Japan

[73] Assignee: Nissan Motor Company, Limited, Yokohama, Japan

[21] Appl. No.: 274,405

[22] Filed: Jun. 17, 1981

[30] Foreign Application Priority Data

Oct. 7, 1980 [JP] Japan ............................ 55-143126[U]

[51] Int. Cl.³ ............................................. B60T 13/48
[52] U.S. Cl. .................................. 192/0.094; 60/397; 60/403; 137/513.3
[58] Field of Search ............... 192/0.094, 85 V, 12 R, 192/4; 137/513.3, 513.7; 60/397, 403

[56] References Cited

U.S. PATENT DOCUMENTS

| | | | |
|---|---|---|---|
| 2,353,161 | 7/1944 | Heijis et al. ...................... | 137/513.3 |
| 2,676,613 | 4/1954 | Baxter ................................. | 137/513 |
| 2,857,988 | 10/1958 | Stelzer ................................. | 60/397 |
| 2,924,237 | 2/1960 | Ellis ..................................... | 137/513.7 |
| 4,024,709 | 5/1977 | Erdmann ............................. | 60/403 |
| 4,030,520 | 6/1977 | Sands .................................. | 137/513.7 |
| 4,332,302 | 6/1982 | Kosmanski .......................... | 60/397 |

*Primary Examiner*—William F. Pate, III
*Attorney, Agent, or Firm*—Schwartz, Jeffery, Schwaab, Mack, Blumenthal & Koch

[57] ABSTRACT

A vacuum system used with an automotive vehicle such that an appropriate negative pressure is maintained within the vacuum system in order to assure the function of the vacuum brake booster even when the vacuum clutch booster is defective with respect to airtightness. A vacuum system according to the present invention comprises a novel second check valve having an orifice formed in the poppet valve or in the valve body, being connected between the intake manifold and the vacuum clutch booster. The second check valve operates as an ordinary check valve in a normal condition but as an orifice in an abnormal condition to prevent the vacuum pressure in the system from being decreased quickly, without use of any conventional vacuum tank.

7 Claims, 5 Drawing Figures

CHECK VALVE USED WITH VACUUM SYSTEM FOR AN AUTOMOTIVE VEHICLE

BACKGROUND OF THE INVENTION

1. Field of the Invention

The present invention relates to a vacuum system used for an automotive vehicle, and more specifically to a check valve used with a vacuum system including a vacuum brake booster and another vacuum actuator (such actuator as used for a vacuum clutch booster) such that it is possible to prevent vacuum pressure (negative pressure) within the vacuum system from being reduced, in case where a trouble with airtightness occurs in the vacuum clutch booster; that is, it is possible to assure the function of the vacuum brake booster which is crucially important for safety.

2. Description of the Prior Art

In a prior-art vacuum system used with an automotive vehicle which comprises an engine intake manifold as a vacuum generator, a vacuum brake booster, a vacuum clutch booster, a first check valve, and a second check valve, when the vacuum clutch booster is defective with respect to airtightness, since the vacuum pressure at the vacuum generator drops, and the vacuum brake booster loses vacuum pressure each time it is actuated, soon the vacuum brake booster does not function effectively and an unusually great brake depressing force is required. In order to overcome this problem, a throttle is provided between the intake manifold and the second check valve and an additional vacuum tank is provided between the second check valve and the vacuum clutch booster, thus resulting in higher cost and larger engine volume.

A more detailed description of the prior-art vacuum system used with an automotive vehicle will be made hereinbelow with reference to the attached drawings under DETAILED DESCRIPTION OF THE PREFERRED EMBODIMENTS.

SUMMARY OF THE INVENTION

With these problem in mind therefore, it is the primary object of the present invention to provide a vacuum system used with an automotive vehicle which can prevent vacuum pressure in the whole vacuum system from being reduced even when loss of airtightness occurs in the vacuum actuator other than the vacuum brake booster in order to assure the function of the vacuum brake booster, being important for safety, with relatively low cost and small volume without using an auxiliary vacuum tank.

To achieve the above-mentioned object, the vacuum system used with an automotive vehicle according to the present invention comprises a second check valve connected between the intake manifold and the other vacuum actuator, in which an orifice is additionally provided therewithin so as to function in the same manner as in a conventional check valve in the case when the other vacuum actuator operates normally but to function as an orifice in the case when the other vacuum actuator is defective with respect to airtightness and thereby the difference in pressure between the points before and after the second check valve increases, closing the check valve.

BRIEF DESCRIPTION OF THE DRAWINGS

The features and advantages of the vacuum system used with an automotive vehicle according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

To facilitate understanding of the present invention, a brief reference will be made to a prior-art vacuum system used with an automotive vehicle.

Figure 1:
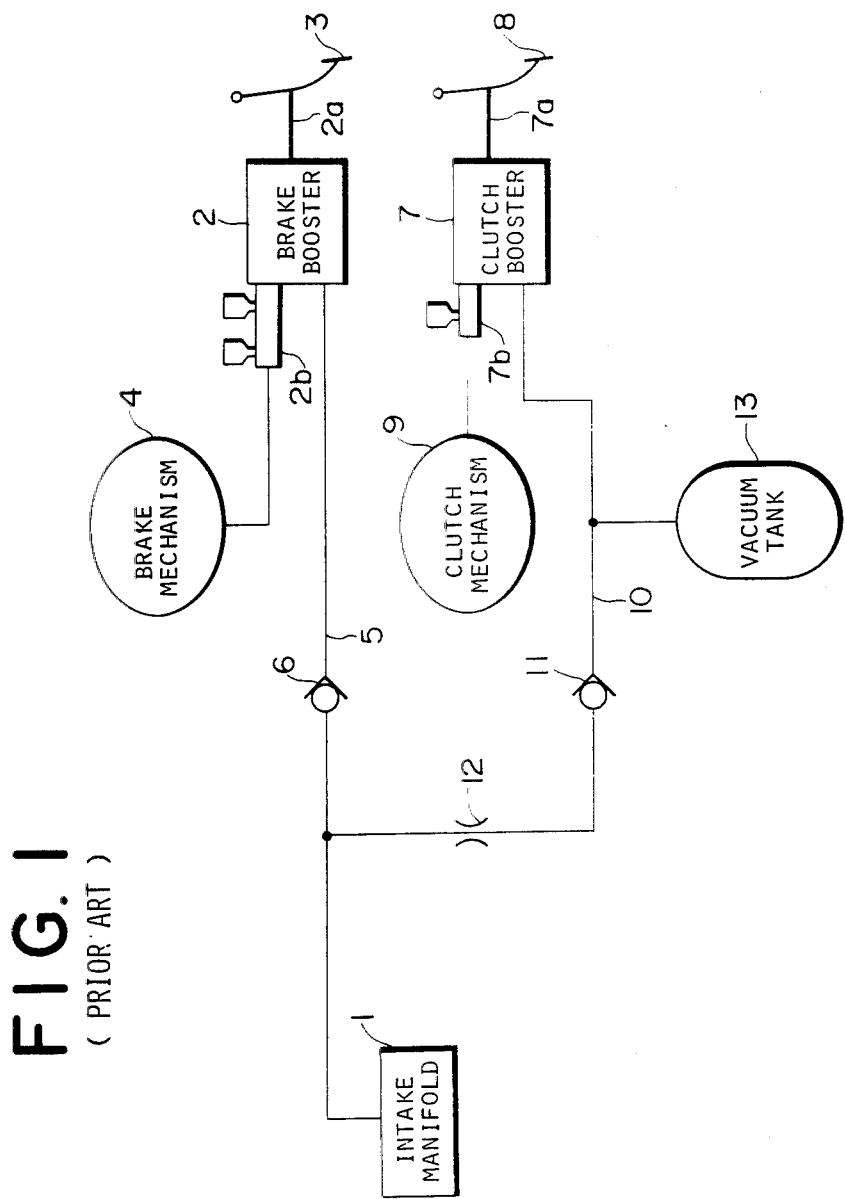
FIG. 1 is a diagrammatic view of a prior-art vacuum system used for an automotive vehicle.

FIG. 1 shows a diagrammatic view of an sample prior-art vacuum system used with an automotive vehicle.

In this figure, the reference numeral 1 denotes an engine intake manifold used as a vacuum generator. The numeral 2 denotes a vacuum brake booster, the input portion 2a of which is connected with the brake pedal 3 and the output portion of which communicates with a master cylinder 2b so constructed as to actuate a brake mechanism 4. The numeral 5 denotes a first communication pipe which communicates between the intake manifold 1 and the vacuum brake booster 2. The numeral 6 denotes a first check valve provided for the first communication pipe 5 midway between the intake manifold 1 and the vacuum brake booster 2 to pass air in the direction from the vacuum brake booster 2 to the intake manifold 1 and to stop the air flowing in the opposite direction thereto. This check valve 6 additionally operates as a vacuum pressure retaining valve to prevent the vacuum pressure on the vacuum brake booster side from being reduced even when the vacuum pressure within the intake manifold 1 drops. The numeral 7 denotes a vacuum actuator used as a vacuum clutch booster, the input portion 7a of which is connected with a clutch pedal 8 and the output portion of which communicates with a clutch master cylinder 7b, so constructed as to actuate a clutch mechanism 9. The numeral 10 denotes a second communication pipe which communicates between the vacuum clutch booster 7 and the intake manifold, the end of which is connected to the first communication pipe 5 between the intake manifold 1 and the first check valve 6. The numeral 11 denotes a second check valve provided midway between the intake manifold 1 and the vacuum clutch booster 7 to pass air in the direction from the vacuum clutch booster 7 to the intake manifold and to stop the air flowing in the opposite direction. This check valve 11 additionally operates as a vacuum pressure retaining valve to prevent the vacuum pressure on the vacuum clutch booster side from being reduced even when the vacuum pressure within the intake manifold 1 drops.

In the vacuum system for an automotive vehicle thus constructed, if the vacuum clutch booster 7 is defective with respect to airtightness, since the vacuum pressure within the whole vacuum system drops and the vacuum brake booster 2 does not function effectively, an unusually great brake-depressing force is required of the driver, resulting in unfavorable conditions from the standpoint of safety. To overcome this problem, a throttle 12 is provided for the second communication pipe 10 midway between the second check valve 11 and the intake manifold 1 to prevent the vacuum pressure on the vacuum brake booster side from being reduced even when the vacuum clutch booster is defective with respect to airtightness.

In addition, in order to compensate for the reduction of the vacuum-supplying function during clutch depression due to the presence of the throttle 12 on the vacuum clutch booster side, a vacuum tank 13 is provided for the second communication pipe 10 midway between the second check valve 11 and the vacuum clutch booster 7.

In a prior-art vacuum system as described above, however, an additional vacuum tank is required, thus resulting in higher cost and larger engine volume.

Figure 2:
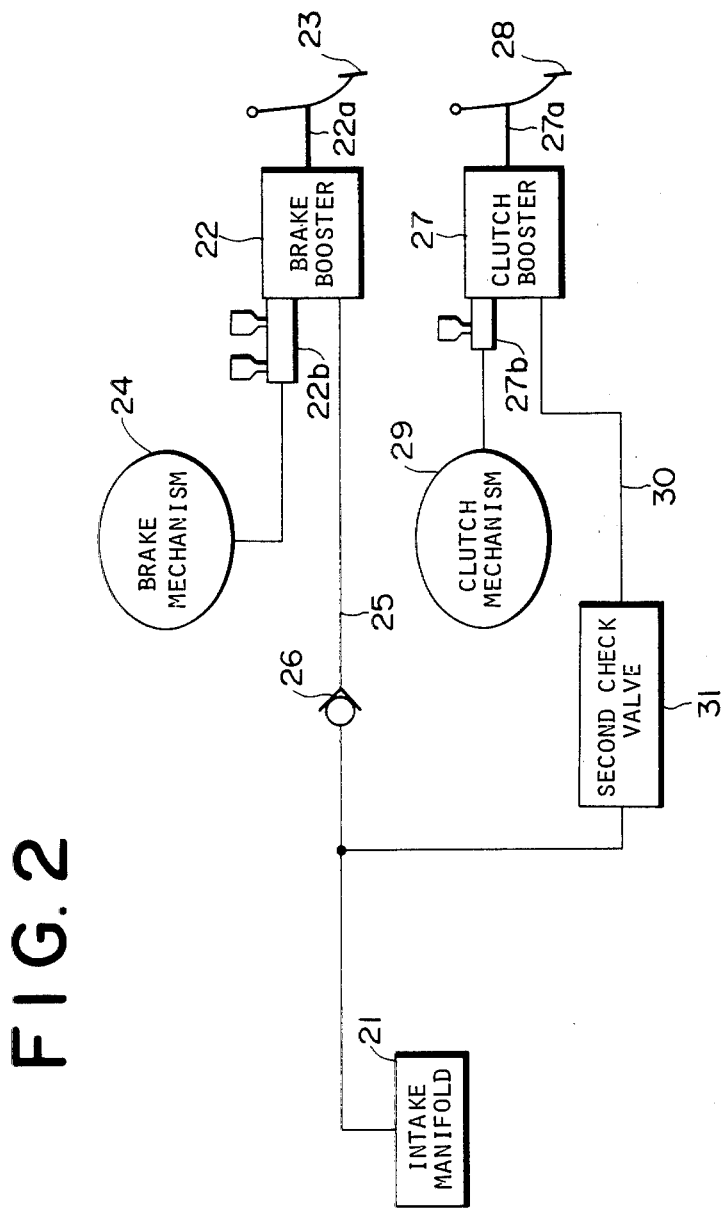
FIG. 2 is a diagrammatic view of the vacuum system used for an automotive vehicle according to the present invention.
Figure 3:
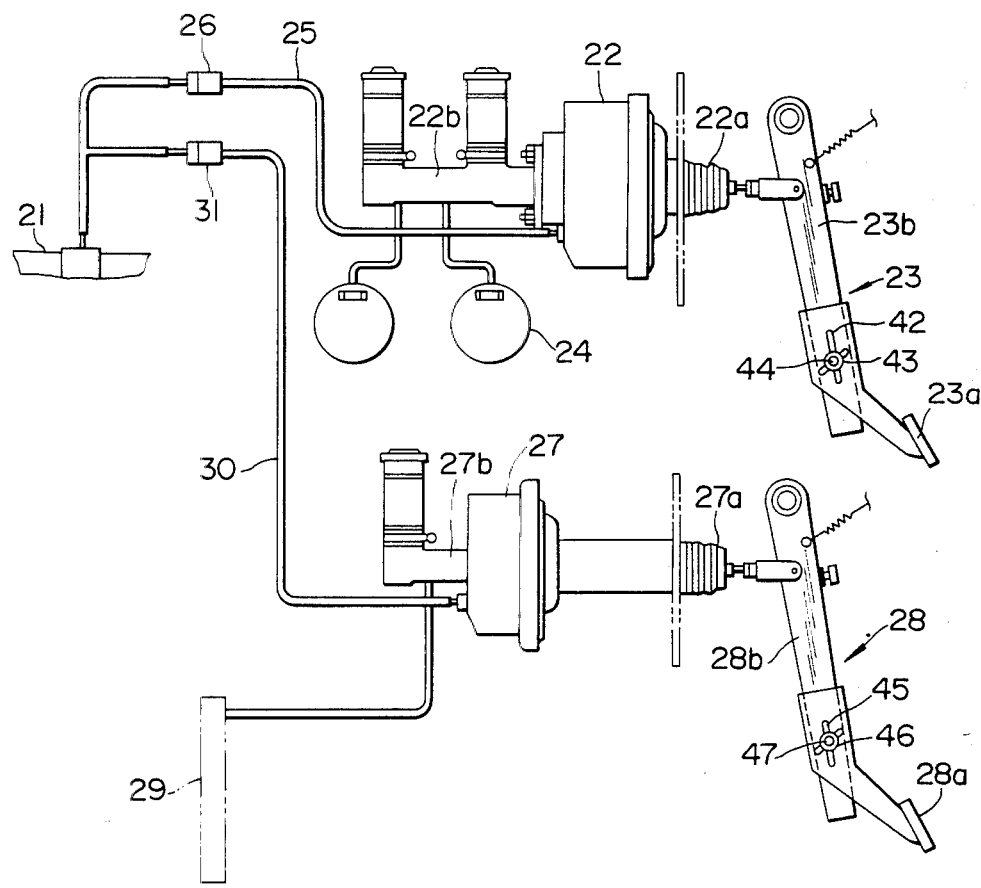
FIG. 3 is a pictorial view showing the vacuum system of FIG. 2.
Figure 4:
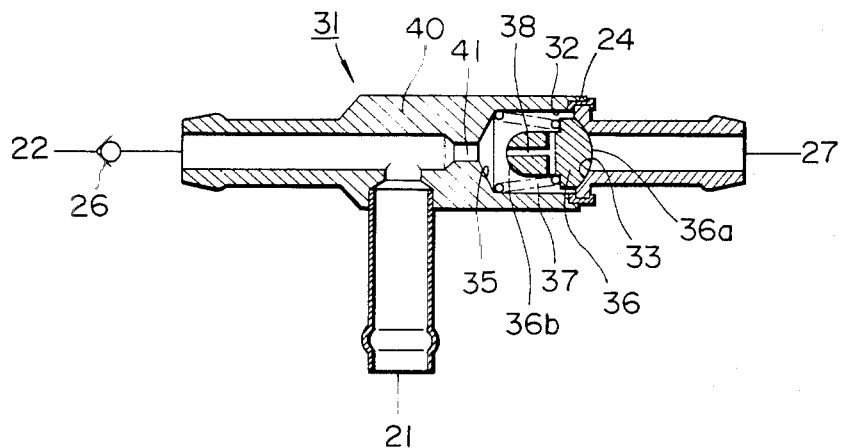
FIG. 4 is an enlarged sectional view of a first embodiment of the second check valve used with the vacuum system according to the present invention.

In view of the above description, reference is now made to FIGS. 2-5, and more specifically to FIGS. 2 and 4.

Figure 5:
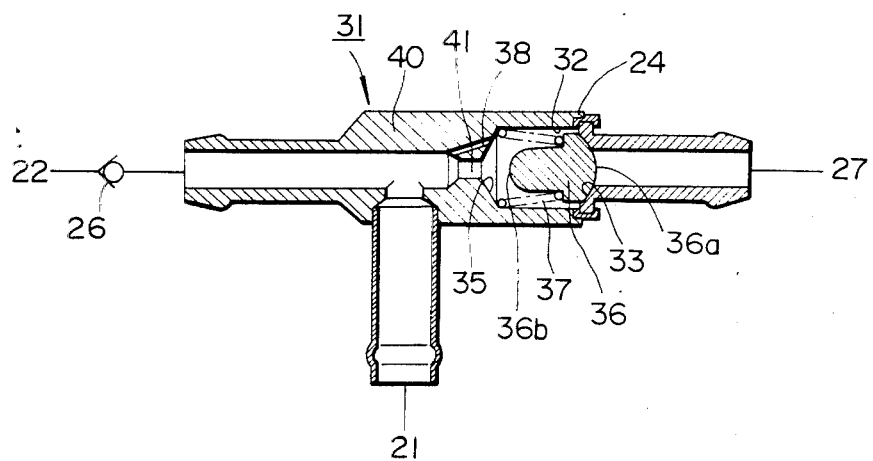
FIG. 5 is an enlarged sectional view of a second embodiment of the second check valve used with the vacuum system according to the present invention.

FIG. 2 is a diagrammatic illustration of the vacuum system used for an automotive vehicle according to the present invention, FIG. 3 is a pictorial view of the vacuum system of FIG. 2, FIG. 4 is an enlarged cross-sectional view of a first embodiment of the second check valve used with the vacuum system according to the present invention, and FIG. 5 is an enlarged sectional view of a second embodiment of the second check valve used with the vacuum system according to the present invention.

In these figures, the reference numeral 21 denotes an engine intake manifold used as a vacuum generator. The numeral 22 denotes a vacuum brake booster, the input portion 22a of which is connected with a brake pedal 23 and output portion of which communicates with the master cylinder 22b, so constructed as to actuate a brake mechanism 24. The numeral 25 denotes a first communication pipe which communicates between the intake manifold 21 and the vacuum brake booster 22. The numeral 26 denotes a first check valve provided for the first communication pipe 25 midway between the intake manifold 21 and the vacuum brake booster 22 to pass air in the direction from the vacuum brake booster 22 to the intake manifold 21 and to stop the air flowing in the opposite direction. This check valve 26 additionally operates as a vacuum-pressure-retaining valve to prevent the vacuum pressure on the vacuum brake booster side from being reduced even when the vacuum pressure within the intake manifold 21 drops. The numeral 27 denotes a vacuum actuator used as a vacuum clutch booster, the input portion 27a of which is connected with a clutch pedal 28 and the output portion of which communicates with a clutch master cylinder 27b, so constructed as to actuate a clutch mechanism 29. The numeral 30 denotes a second communication pipe which communicates between the vacuum clutch booster 27 and the intake manifold 21, the end of which is connected with the first communication pipe 25 between the intake manifold 21 and the first check valve 26.

As is depicted in FIG. 3, a brake pedal 23 and a clutch pedal 28 are both adjustable upwards or downwards by sliding a brake pedal member 23a or a clutch pedal member 28a along a brake lever 23b or a clutch lever 28b respectively.

Bolts 44 and 47 are installed in the respective levers 23b and 28b, and the pedal members 23a and 28a are fixed to the levers by using nuts 43 and 46. In this embodiment, it is of course possible to use ordinary nonadjustable pedals. The numeral 31 denotes a second check valve provided for the second communication pipe. As is depicted in FIG. 4, the second check valve 31 comprises a valve chamber 32, a spherically-recessed valve opening 33 provided on the vacuum clutch booster side (rightward in FIG. 4), and a conically-recessed valve opening 35 at the center thereof provided on the intake manifold side (leftward in FIG. 4). Within the valve chamber 32, a poppet valve 36 is disposed so as to move right and left to close the two valve openings 33 and 35 according to difference in pressure between the vacuum clutch booster side and the intake manifold side. The poppet valve 36 has a spherical surface 36a on the right side in FIG. 4 and another spherical surface 36b on the left side in FIG. 4, being always urged in the direction of the valve opening 33 provided on the vacuum clutch booster side by a force of a spring 37 provided between the valve body 40 and the poppet valve 36. The numeral 38 denotes an orifice formed in the poppet valve 36 which has an air passageway smaller than that of the valve opening passage 41 in area which communicates the valve chamber 32 with the intake manifold 21 through the second communication pipe 30 at all times.

There is described hereinbelow the operation of the vacuum system used with an automotive vehicle.

When the driver depresses the brake pedal 23 or the clutch pedal 28 to actuate the brake mechanism 24 or the clutch mechanism 29 while driving the automotive vehicle, the depression force applied to the brake pedal 23 or the clutch pedal 28 is multiplied by the vacuum brake booster 22 or the vacuum clutch booster 27. Therefore, it is possible to actuate the brake mechanism 24 and the clutch mechanism 29 by the use of a weak pedal-depression force, and thereby it is possible to brake the automotive vehicle, engage/disengage the clutch, or control the clutch under a sliding clutch condition easily without the use of a great pedal-depressing force.

Now, operation of the vacuum brake booster 22 is explained hereinbelow.

Since the intake manifold 21 is in a vacuum state while the vehicle is travelling, both sides of a power piston (not shown) disposed in the vacuum brake booster 22 are also kept in a vacuum state through the first communication pipe 25 and the first check valve 26. Therefore, when the brake pedal 23 is depressed, atmospheric pressure air is introduced into the side of the power piston nearer the brake pedal 23. As a result, the difference in pressure between the two sides of the power piston moves the power piston in the opposite direction.

When the brake pedal 23 is released, the atmospheric-pressure air introduced into the side of the power piston nearer the brake pedal 23 is absorbed into the intake manifold 21 through the first communication pipe 25 and the first check valve 26, and both sides of the power piston return to vacuum condition, allowing the power piston to be returned to the original position by the force of a spring (not shown) provided therewithin. As a result, the brake mechanism 24 returns to the original position to release the braking force. The vacuum clutch booster operates in the same manner as the vacuum brake booster.

In the second check valve 31 according to the present invention, the second check valve 31 retains the vacuum pressure on the vacuum clutch booster side 27 preventing the air from flowing therethrough, in the case where the engine stops generating vacuum pressure from the intake manifold 21 or where the vacuum pressure on the vacuum clutch booster side 27 is equal to or greater than that on the intake manifold side 21, as shown in FIG. 4.

Next, in the case where the clutch pedal 28 is depressed while vacuum pressure is being generated from the intake manifold 21, atmospheric pressure air is introduced into the vacuum clutch booster 27 and then passed to the intake manifold 21 through the second communication pipe 30. During depression of the clutch, the poppet valve 36 is moved toward the intake manifold 21, that is, leftward in FIG. 5 to open the valve opening 33 against the force of the coil spring 37. In the normal case, since the volume of air introduced into the second check valve 31 from the vacuum clutch booster 27 is not great, the coil spring force urging the poppet valve 36 against the valve opening 33 is almost equal to the difference in pressure between the valve openings 33 and 35, both the valve openings 33 and 35 are kept open with the left end 36b of the poppet valve 36 kept apart from the valve opening 35 on the intake manifold side 21, and air flows into the valve chamber 32 from the valve opening 33 on the vacuum clutch booster side 30 to the valve opening 35 on the intake manifold side. Therefore, in this case the second check valve 31 operates as an ordinary check valve without operating as an orifice.

In the case where the vacuum clutch booster 27 is defective with respect to airtightness, a great volume of air is introduced into the valve chamber 32 through the valve opening 33 on the vacuum clutch booster side. In this case, since the difference in pressure between the valve opening 33 on the vacuum clutch booster side and the valve opening 35 on the intake manifold side becomes greater than the force of the coil spring 37, the poppet valve 36 is pushed leftward to close the valve opening 35 with the left end 36b of the poppet valve 36 brought fully into contact with the valve body 40 on the intake manifold side. As a result, since the defective vacuum clutch booster 27 communicates with the intake manifold 21 through the orifice 38 having a smaller area of air flow, it is possible to prevent a great volume of air from being introduced into the intake manifold 21, that is, to prevent the vacuum pressure in the whole vacuum system from being decreased in the same manner as with the conventional throttle.

As described hereinabove, even if the vacuum clutch booster 27 is defective with respect to air tightness, since it is possible to prevent the vacuum pressure on the vacuum brake booster side 22 from being decreased, it is possible to assure the function of the vacuum brake booster 22 which is very important for safety.

Furthermore, in this embodiment, the orifice 38 serves to prevent the poppet valve 36 from closing the valve opening 35 when the engine is started, and to recover the function of the vacuum clutch booster 27 by relieving the air on the vacuum clutch booster side gradually so as to move the poppet valve 36 rightward when a large volume of air is introduced in case where the vacuum clutch booster 27 is excessively actuated or when the defective airtightness is temporary.

As shown in FIG. 4, in this embodiment, since the poppet valve 36, which can move right and left according to the difference in pressure between the vacuum clutch booster side and the intake manifold side so as to close the valve openings 33 and 35 independently, is disposed having a right spherical surface 36a and a left spherical surface 36b formed on both the end surfaces thereof, even if the axis of the poppet valve 36 is tilted with respect to the axis of the valve body 40, the poppet valve 36 is closely and securely brought into contact with the valve body 40 under higher reliable conditions.

FIG. 5 shows a second embodiment according to the present invention. In this embodiment, the orifice 38 is provided in the valve body 40 to communicate between the valve chamber 32 and the intake manifold 21. The construction and operation of this embodiment are the same as in the first embodiment, except the position of the orifice.

As described above, in the vacuum system for an automotive vehicle according to the present invention in which a vacuum brake booster and another vacuum actuator such as a vacuum clutch booster are provided, since an orifice is provided within the check valve connecting a vacuum generator such as an intake manifold and the other vacuum actuator in order to function as a check valve in the case when the other vacuum actuator operates in a normal state but to function as an orifice in the case when the other vacuum actuator is defective with respect to air tightness, it is possible to prevent the vacuum pressure in the whole vacuum system from being decreased, to assure the function of the vacuum brake booster being important for safety, and to reduce cost and engine volume by avoiding use of the conventional vacuum tank.

Further, in the vacuum system used for an automotive vehicle according to the present invention, since the check valve used with the vacuum system for an automotive vehicle comprises the poppet valve with a spherical surface formed on the vacuum generator side and the valve seat with a conically recessed surface formed on the same side, it is possible to bring the poppet valve into contact with the valve seat securely on the vacuum generator side. Accordingly, since the air flowing from the vacuum actuator side to the vacuum generator side can be restricted effectively through the orifice, it is possible to prevent the negative pressure on the vacuum brake booster side from being reduced, that is, to secure safety in driving an automotive vehicle. In addition, since the valve seat is integrally formed with the valve body on the vacuum generator side, it is possible to reduce the cost and the weight under a relatively simple construction without an additional plate to form the valve seat within the valve chamber.

It will be understood by those skilled in the art that the foregoing description is in terms of preferred embodiments of the present invention wherein various changes and modifications may be made without departing from the spirit and scope of the invention, as is set forth in the appended claims.

(Reference Numerals)

21—Vacuum generator (intake manifold)
22—Vacuum brake booster
24—Brake mechanism
25—First communication pipe
26—First check valve
27—Vacuum actuator (vacuum clutch booster)
29—Actuator mechanism (clutch mechanism)

30—Second communication pipe
31—Second check valve
32—Valve chamber
33—Valve opening on vacuum actuator side
35—Valve opening on vacuum generator side
36—Poppet valve
37—Coil spring
38—Orifice
40—Valve body
41—Valve opening passage
38—Orifice
40—Vacuum actuator
41—Throttle

What is claimed is:

1. A vacuum system for an automotive vehicle which avoids the use of a conventional vacuum tank, and which comprises:
   (a) a vacuum generator for generating a negative pressure to actuate the system while the vehicle is travelling;
   (b) a brake mechanism for applying a brake force to the vehicle;
   (c) a vacuum brake booster actuated by a brake pedal for actuating said brake mechanism according to a difference between negative pressure introduced from said vacuum generator and atmospheric pressure introduced from the outside when said brake pedal is depressed;
   (d) a first check valve for passing air from said vacuum brake booster to said vacuum generator when a vacuum is generated by said vacuum generator and for stopping air from flowing from said vacuum generator to said vacuum brake booster, said first check valve being connected between said vacuum brake booster and said vacuum generator;
   (e) an actuator mechanism for applying an actuating force to the vehicle;
   (f) a vacuum actuator actuated by an actuator pedal for actuating said actuator mechanism according to a difference between negative pressure introduced from said vacuum generator and atmospheric pressure introduced from the outside when said actuator pedal is depressed; and
   (g) a second check valve connected directly to said vacuum actuator and located between said vacuum actuator and said vacuum generator in parallel with said first check valve, there being no vacuum-generating means between said second check valve and said vacuum actuator, which second check valve comprises:
      (1) a valve body having a valve chamber, a first valve opening to communicate with said vacuum actuator, and a second valve opening to communicate with said vacuum generator;
      (2) a coil spring housed within said valve body; and
      (3) a poppet valve having a first spherical surface and a second spherical surface, said poppet valve being provided with an orifice formed therein so as to communicate between the valve chamber and said vacuum generator, said poppet valve being urged against the first valve opening by the force of said coil spring, the first spherical surface being formed so as to close the first valve opening and the second spherical surface being formed so as to close the second valve opening, whereby said second check valve functions like said first check valve in regulating the passage of air from said vacuum actuator to said vacuum generator when said vacuum system operates normally, but functions as an orifice in restricting said passage of air when said vacuum actuator operates defectively to introduce a substantial volume of air into said vacuum actuator in an abnormal state.

2. A vacuum system for an automotive vehicle as set forth in claim 1, wherein said second check valve, connected between said vacuum actuator and said vacuum generator in parallel with said first check valve, comprises:
   (a) a valve body having a valve chamber, a first valve opening to communicate with said vacuum actuator, and a second valve opening to communicate with said vacuum generator, said valve body being provided with an orifice formed therein so as to communicate between the valve chamber and said vacuum generator;
   (b) a coil spring housed within said valve body; and
   (c) a poppet valve having a first spherical surface and a second spherical surface, said poppet valve being urged against the first valve opening by the force of said coil spring, the first spherical surface being formed so as to close the first valve opening and the second spherical surface being formed so as to close the second valve opening.

3. A vacuum system for an automotive vehicle as set forth in any of claims 1 and 2, wherein said vacuum generator is an intake manifold.

4. A vacuum system for an automotive vehicle as set forth claim 1, wherein said actuator mechanism is a clutch mechanism to engage, disengage, or both engage and disengage a clutch disk.

5. A vacuum system for an automotive vehicle as set forth in any of claims 1 and 2, wherein said vacuum actuator is a vacuum clutch booster.

6. A vacuum system for an automotive vehicle which avoids the use of a conventional vacuum tank, comprising:
   (a) a vacuum generator for generating negative pressure to actuate said system;
   (b) a first vacuum actuated device connected to said generator;
   (c) a second vacuum actuated device connected to said generator; and
   (d) valve means, connected directly to said second vacuum activated device and located between said generator and said second vacuum actuated device, there being no vacuum-generating means between said valve means in said second vacuum actuated device, said valve means comprising
      (i) means for permitting substantially one-way flow of air from said generator to said second vacuum actuated device, and
      (ii) means for restricting said flow of air between said generator and said second vacuum actuated device only when said second vacuum actuated device operates defectively to introduce substantial amounts of air into said vacuum system.

7. A vacuum system as in claim 6, where said first vacuum actuated device comprises a vacuum brake booster and said second vacuum actuated device comprises a vacuum clutch booster.

* * * * *